Feb. 7, 1933. A. A. STONE 1,896,732
MECHANICAL MOVEMENT
Filed Nov. 4, 1930
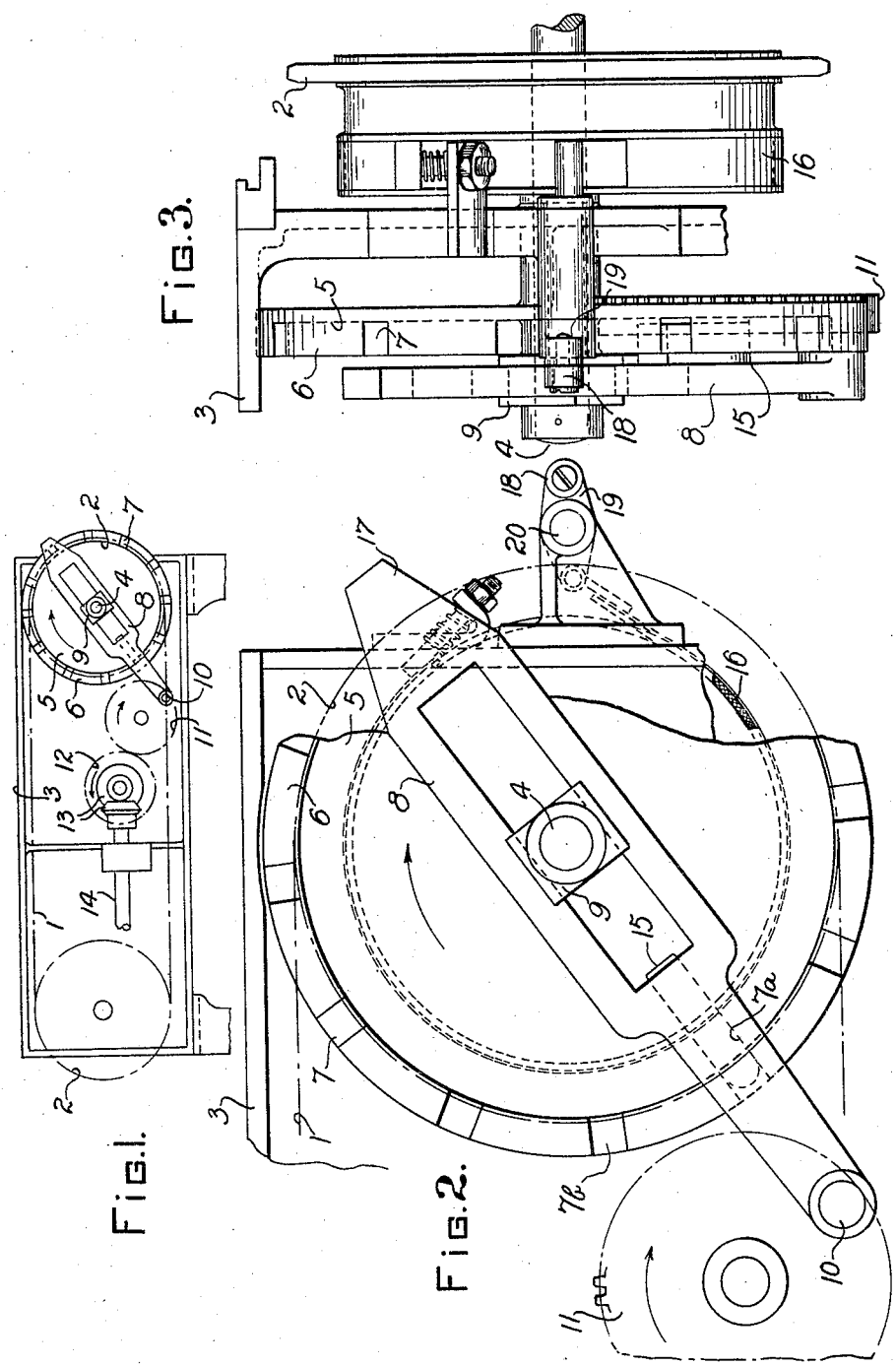
INVENTOR
Albert Alexander Stone,
By Watson, Coit, Morse & Grindle
Attys Patented Feb. 7, 1933

1,896,732

UNITED STATES PATENT OFFICE

ALBERT ALEXANDER STONE, OF DEPTFORD, LONDON, ENGLAND

MECHANICAL MOVEMENT

Application filed November 4, 1930, Serial No. 493,441, and in Great Britain November 23, 1929.

This invention is for improvements in packing machinery, and relates more particularly to a conveyor mechanism for use on such machinery.

The invention has for its object to provide mechanism for operating an intermittently moving conveyor which is simple in action and moves the conveyor from stage to stage without shock.

The invention comprises an intermittent motion for operating a chain conveyor comprising a disc attached to the driving gear of said conveyor, and furnished with a number of equally spaced radial slots, and a connecting rod having a projection adapted to enter each slot in succession and rotate the disc.

The invention will be more particularly described with reference to the accompanying drawing, in which:—

Fig. 1 shows a diagram of a portion of a packing machine, with the invention applied thereto.

Fig. 2 is an enlarged view of an intermittent motion constructed according to the invention, and Fig. 3 is an end elevation of Fig. 2.

Referring to the drawing, 1 is an endless chain conveyor carried on sprocket wheels 2 mounted on the frame 3 of the machine and intermittently driven in the manner hereinafter described.

The chain conveyor is preferably furnished with a series of pockets adapted to form moulds for receiving packets.

On the spindle 4 of one of the sprocket wheels is fixed a disc 5 provided with an upstanding rim 6 which is divided into a number of equally spaced radial slots 7. A slotted connecting rod 8 is arranged to slide on a bush 9 mounted on the spindle 4, and the other end of the connecting rod is attached to a crank pin 10 on a gear wheel 11 which is continuously driven.

In Fig. 1 the gear 11 is shown as driven by another gear 12 through a pair of bevels 13 from a main shaft 14 which carries a belt pulley (not shown). The underside of the connecting rod 8 has a projecting piece or tooth 15 fixed thereto, the said tooth being adapted to slide through one of the radial slots as the connecting rod is driven by the crank pin.

When the driving wheel 11 is rotated, the projecting tooth 15 slides in one of the radial slots as shown, and the swinging motion of the connecting rod causes the slotted disc 5 to rotate and move the chain conveyor the required distance.

Referring to Fig. 2, it will be seen that the connecting rod is in such a position that the tooth 15 has entered a radial slot, and as the wheel 11 rotates, the swinging movement of the connecting rod will cause the tooth 15 to rotate the wheel 5 through a small angle, and on the return motion of the connecting rod, the slot which is indicated by $7^a$ will have been moved into the position shown by $7^b$, and further movement of the connecting rod will cause the tooth 15 to disengage from the slot and pass into the interior space of the disc.

As the connecting rod continues to move, the tooth will again enter the next succeeding slot and the motion will be repeated.

A band brake 16 is provided for arresting the motion of the disc and retaining the same immovable immediately the tooth on the connecting rod passes clear of one of the radial slots. The band is operated by the end 17 of the connecting rod striking a roller 18 carried on a lever 19 pivoted at 20.

In some cases the brake may be dispensed with owing to the fact that for some time before the tooth 15 moves clear of the radial slot, the disc is practically stationary.

It will be seen that by this invention, an intermittent motion is obtained which starts slowly from rest and accelerates, and is then retarded until when the driving tooth is about to leave the slotted wheel, the latter is practically stationary.

What I claim as my invention and desire to secure by Letters Patent is:—

1. A mechanical movement comprising a rotatable driven element, a lever, a rotatable driving member having an eccentric connection with said lever for imparting oscillatory movement to the latter, a fixed fulcrum on which said lever is slidably supported, said lever having a driving portion arranged to engage said driven element during oscillatory movement of said lever in one direction only to impart intermittent motion thereto, the driven element and the driving portion of said lever being so disposed that the eccentric connection between the lever and the driving member moves through that portion of its path of movement nearest the fulcrum while the lever is disengaged from said driven member, whereby driving connection between said lever and said driven member may be maintained during movement of said eccentric connection through an arc greater than 180°, and a friction brake for said driven member operable by said lever immediately on the completion of the driving stroke of the latter.

2. A mechanical movement comprising a rotatable driven element, a lever, a rotatable driving member having an eccentric connection with said lever for imparting oscillatory movement to the latter, a fixed fulcrum on which said lever is slidably supported, said lever having a driving portion arranged to engage said driven element during oscillatory movement of said lever in one direction only to impart intermittent motion thereto, the driven element and the driving portion of said lever being so disposed that the eccentric connection between the lever and the driving member moves through that portion of its path of movement nearest the fulcrum while the lever is disengaged from said driven member, whereby driving connection between said lever and said driven member may be maintained during movement of said eccentric connection through an arc greater than 180°, a friction brake for said driving member, and operating means for said brake positioned for engagement and actuation by said lever immediately on the completion of the driving stroke of the latter.

3. A mechanical movement comprising in combination a rotatable driven element having an axially projecting flange, a lever pivotally and slidably mounted on a fulcrum that is in axial alignment with the axis of the driven element, a rotatable driving element having an eccentric connection with the lever for imparting oscillatory movement to the latter, and a clutch element on the lever located between the axis of the fulcrum and the flange whereby said clutch element is moved into and out of engagement with the flange by sliding movement of the lever in opposite directions and the driven element is rotated by angular movement of the lever when the latter is locked to the driven element.

4. A mechanical movement comprising in combination a rotatable driven element having an axially projecting flange, a lever pivotally and slidably mounted on a fulcrum that is in axial alignment with the axis of the driven element, a rotatable driving element having an eccentric connection with the lever for imparting oscillatory movement to the latter, a clutch element on the lever located between the axis of the fulcrum and the flange whereby said clutch element is moved into and out of engagement with the flange by sliding movement of the lever in opposite directions and the driven element is rotated by angular movement of the lever when the latter is locked to the driven element, a friction brake for the driven element, and operating means for the brake positioned for engagement and actuation by said lever immediately on the completion of the driving stroke of the latter.

5. A mechanical movement comprising in combination a rotatable driven element having an axially projecting flange, a lever pivotally and slidably mounted on a fulcrum that is in axial alignment with the axis of the driven element, a rotatable driving element having an eccentric connection with the lever for imparting oscillatory movement to the latter, and clutch means for locking the flange of the driven element to the lever comprising a recess in one element and a dog on the other, the clutch element on the lever being located between the flange and the axis of the fulcrum whereby it is moved into and out of engagement with the cooperating clutch element on the flange by sliding movement of the lever in opposite directions and the driven element is rotated by angular movement of the lever when the clutch elements are locked together.

6. A mechanical movement according to claim 5 wherein the clutch elements on the flange of the driven element are equally spaced around the periphery of the flange.

7. A mechanical movement comprising in combination a rotatable driven element having an axially projecting annular flange provided with a plurality of equally spaced radial apertures, a lever pivotally and slidably mounted on a fulcrum that is in alignment with the axis of the driven element, a rotatable driving element having an eccentric connection with the lever for imparting oscillatory movement to the latter, a projection on the lever located between the flange and the axis of the fulcrum and directed radially outwardly to enter any one of the apertures in the flange, whereby the projection is moved into and out of engagement with the apertures in the flange by sliding movement of the lever in opposite directions and the driven element is rotated by angular movement of the lever when the projection is in an aperture of the flange.

8. A mechanical movement comprising in combination a rotatable driven element having an axially projecting flange, a lever pivotally and slidably mounted on a fulcrum that is in axial alignment with the axis of the driven element, a rotatable driving element having an eccentric connection with the lever for imparting oscillatory movement to the latter, and clutch means for locking the flange of the driven element to the lever comprising a recess in one element and a dog on the other, the clutch element on the lever being located between the flange and the axis of the fulcrum whereby it is moved into and out of engagement with the cooperating clutch element on the flange by sliding movement of the lever in opposite directions, and the driven element is rotated by angular movement of the lever when the clutch elements are locked together, a friction brake for the driven element, and operating means for the brake positioned for engagement and actuation by said lever immediately on the completion of the driving stroke of the latter.

9. A mechanical movement comprising in combination a rotatable driven element having an axially projecting annular flange provided with a plurality of equally spaced radial apertures therein, a lever pivotally and slidably mounted on a fulcrum that is in alignment with the axis of the driven element, a rotatable driving element having an eccentric connection with the lever for imparting oscillatory movement to the latter, a projection on the lever located between the flange and the axis of the fulcrum and directed radially outwardly to enter any one of the apertures in the flange, whereby the projection is moved into and out of engagement with the apertures in the flange by sliding movement of the lever in opposite directions and the driven element is rotated by angular movement of the lever when the projection is located in an aperture of the flange, a friction brake for the driven element, and operating means for the brake positioned for engagement and actuation by said lever immediately on the completion of the driving stroke of the latter.

In testimony whereof I hereunto affix my signature.

ALBERT ALEXANDER STONE.